(12) United States Patent
Kodaka

(10) Patent No.: US 10,894,445 B2
(45) Date of Patent: Jan. 19, 2021

(54) PNEUMATIC TIRE

(71) Applicant: Sumitomo Rubber Industries, Ltd., Kobe (JP)

(72) Inventor: Kazuma Kodaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 196 days.

(21) Appl. No.: 15/675,049

(22) Filed: Aug. 11, 2017

(65) Prior Publication Data
US 2018/0056725 A1 Mar. 1, 2018

(30) Foreign Application Priority Data
Sep. 1, 2016 (JP) ................... 2016-171110

(51) Int. Cl.
*B60C 11/03* (2006.01)
*B60C 11/13* (2006.01)

(52) U.S. Cl.
CPC ........ *B60C 11/0302* (2013.01); *B60C 11/032* (2013.01); *B60C 11/033* (2013.01);
(Continued)

(58) Field of Classification Search
CPC ............... B60C 11/032; B60C 11/1384; B60C 11/0304; B60C 2011/0381
(Continued)

(56) References Cited

U.S. PATENT DOCUMENTS 3,768,535 A * 10/1973 Holden ............... B60C 11/0309
152/209.24
5,016,695 A * 5/1991 Kuze .................... B60C 19/001
152/209.18
(Continued)

FOREIGN PATENT DOCUMENTS

EP 0 686 517 A1 12/1995
GB 1 588 575 4/1981
(Continued)

OTHER PUBLICATIONS

English translation of Watanabe JPH0624213 (A), Retrieved form Espacenet Patent Search on May 22, 2019 (Year: 1994).*
(Continued)

*Primary Examiner* — Robert C Dye
*Assistant Examiner* — Edgaredmanuel Troche
(74) *Attorney, Agent, or Firm* — Birch, Stewart, Kolasch & Birch, LLP

(57) ABSTRACT

A pneumatic tire includes a tread portion including an inboard tread region between a tire equator and an inboard tread edge, and an outboard tread region between the tire equator and an outboard tread edge. The inboard tread region is provided with a first main groove extending and a second main groove each extending continuously in the tire circumferential direction. The outboard tread region is provided with a plurality of recesses that are not in communication with other grooves. The recesses include a plurality of deep bottom recesses having depths equal to or more than 5 mm. A total of opening areas of the deep bottom recesses on a ground contact surface of the tread portion is equal to or less than 5% of a surface area of the outboard tread region that is obtained by filling up all grooves and recesses provided thereon.

18 Claims, 10 Drawing Sheets

(52) U.S. Cl.
CPC ...... *B60C 11/0304* (2013.01); *B60C 11/0323* (2013.01); *B60C 2011/0341* (2013.01); *B60C 2011/0351* (2013.01); *B60C 2011/0355* (2013.01); *B60C 2011/0358* (2013.01); *B60C 2011/0362* (2013.01); *B60C 2011/0365* (2013.01); *B60C 2011/0369* (2013.01); *B60C 2011/0383* (2013.01); *B60C 2011/0386* (2013.01); *B60C 2011/1361* (2013.01)

(58) Field of Classification Search
USPC .................................................. 152/209.17
See application file for complete search history.

(56) References Cited

U.S. PATENT DOCUMENTS

| | | | | | |
|---|---|---|---|---|---|
| 5,622,575 | A | * | 4/1997 | Meyer-Adlung | B60C 11/00 152/209.5 |
| 7,140,410 | B2 | * | 11/2006 | Helt | B60C 11/0306 152/154.2 |

FOREIGN PATENT DOCUMENTS

| | | | | | |
|---|---|---|---|---|---|
| GB | 1588575 | A | * | 4/1981 | ............. B60C 11/18 |
| JP | 3-32906 | A | | 2/1991 | |
| JP | 06024213 | A | * | 2/1994 | ......... B60C 11/1384 |
| JP | 2002-225511 | A | | 8/2002 | |
| JP | 2004-338628 | A | | 12/2004 | |
| JP | 2010179896 | A | * | 8/2010 | |
| JP | 2016-43818 | A | | 4/2016 | |
| WO | WO 2014/171353 | A1 | | 10/2014 | |
| WO | WO-2014167990 | A1 | * | 10/2014 | ......... B60C 11/0304 |
| WO | WO-2015129139 | A1 | * | 9/2015 | ......... B60C 11/0304 |

OTHER PUBLICATIONS

English translation of Mito (WO2014167990A), Retrieved form Espacenet Patent Search on May 22, 2019 (Year: 2014).*
Kiwaki, Koyo; "Pneumatic Tire"; (2010); English Translation (Year: 2010).*
Mito, Yosuke; "Pneumatic Tire"; (2014); English Translation (Year: 2014).*
Yaegashi, Tsuyoshi; "Pneunnati Tire"; (2014) English Translation from EP3112186A1 (Year: 2014).*
Extended European Search Report dated Dec. 22, 2017, in European Patent Application No. 17187643.6.

* cited by examiner

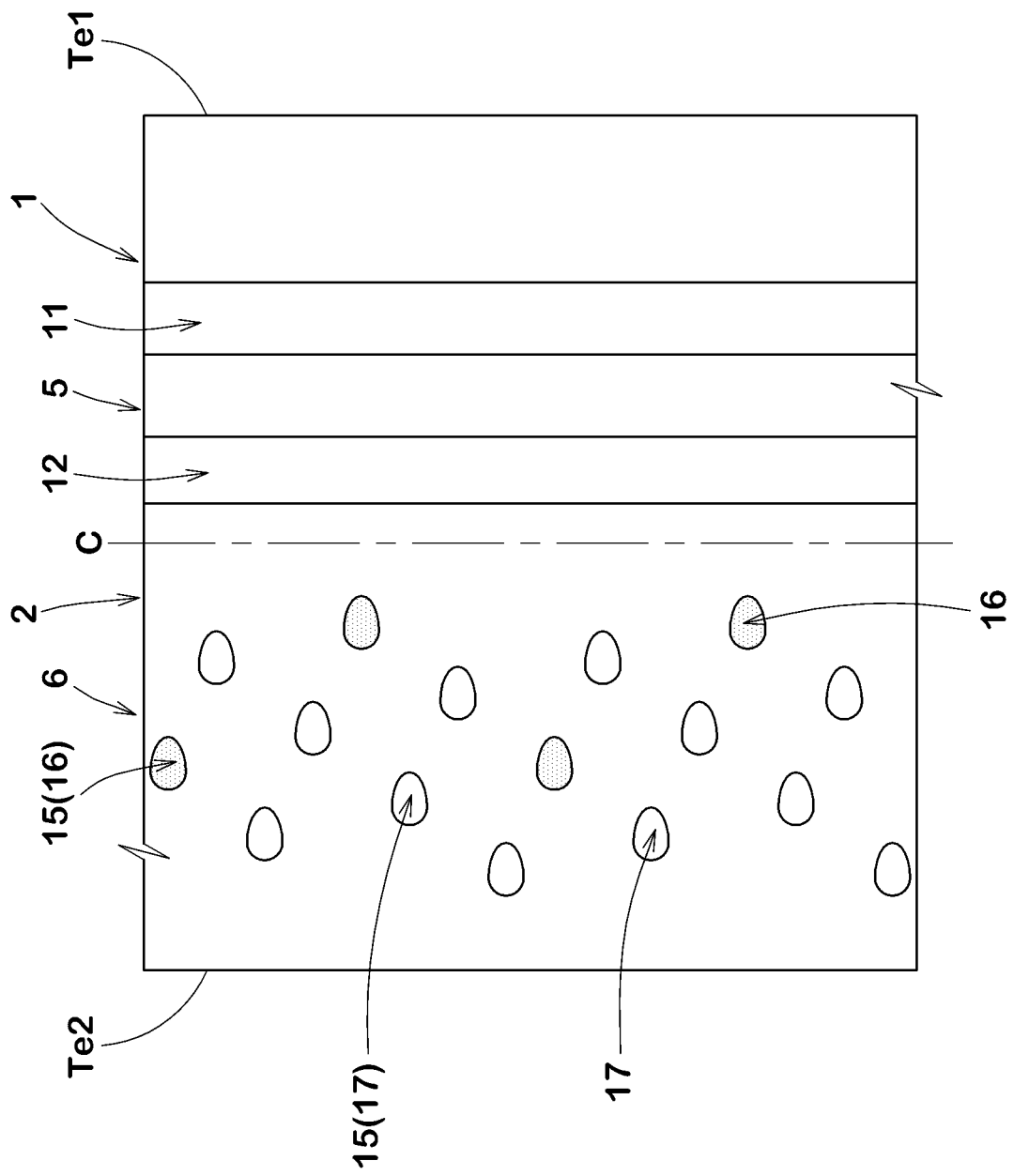

PNEUMATIC TIRE

BACKGROUND ART

Field of the Invention

The present invention relates to pneumatic tires, and more particularly to a pneumatic tire capable of improving dry performance, wet performance and uneven wear resistance.

Description of the Related Art

Conventionally, Japanese Unexamined Patent Application Publication No. 2004-338628 discloses high performance pneumatic tire which is mainly directed to sports driving on race tracks while capable of driving on public roads. Such a pneumatic tire is required a high dry performance when sports driving as well as wet performance on public roads. Furthermore, the pneumatic tire is required high even wear resistance on an outboard tread region since the outboard tread region is subject to high load when sports driving.

SUMMARY OF THE INVENTION

In view of the above problems in the conventional art, the present invention has a primary object to provide a pneumatic tire capable of improving dry performance, wet performance and uneven wear resistance.

In one aspect of the present invention, a pneumatic tire includes a tread portion having an installing direction to a vehicle to define an outboard tread edge and an inboard tread edge. The tread portion includes an inboard tread region between a tire equator and the inboard tread edge and an outboard tread region between the tire equator and the outboard tread edge. The inboard tread region is provided with a first main groove extending continuously in a tire circumferential direction on the side of the inboard tread edge and a second main groove extending continuously in the tire circumferential direction on the side of the tire equator. The outboard tread region is provided with a plurality of recesses that are not in communication with other grooves. The recesses include a plurality of deep bottom recesses having depths equal to or more than 5 mm, and a total of opening areas of the deep bottom recesses on a ground contact surface of the tread portion is equal to or less than 5% of a surface area of the outboard tread region that is obtained by filling up all grooves and recesses provided thereon.

In another aspect of the invention, the recesses may include at least one shallow bottom recess having a depth less than 5 mm, and a total of opening areas of the at least one shallow bottom recess on the ground contact surface of the tread portion may be in a range of from 3% to 10% of the surface area of the outboard tread region.

In another aspect of the invention, the outboard tread region may not be provided with any other grooves except the recesses.

In another aspect of the invention, each of the recesses may have a length in a tire axial direction in a range of from 5% to 30% of a width of the outboard tread region in the tire axial direction.

In another aspect of the invention, each of the recesses may have a length in the tire circumferential direction in a range of from 30% to 70% of the length of the recess in the tire axial direction.

In another aspect of the invention, each of the recesses has an opening edge on the ground contact surface of the tread portion, and the opening edge may be configured as an arc without having a straight portion.

In another aspect of the invention, the opening edge may be formed in a substantially egg shape such that an area center of the opening edge is located outside in the tire axial direction with respect to the center point of the opening edge in the tire axial direction.

In another aspect of the invention, the first main groove may have a groove centerline located at a distance in a tire axial direction of from 0.40 to 0.70 times a width of the inboard tread region from the tire equator.

In another aspect of the invention, the second main groove may have a groove centerline located at a distance in the tire axial direction of from 0.05 to 0.20 times the width of the inboard tread region from the tire equator.

In another aspect of the invention, at least one of the first main groove and the second main groove may include a pair of groove walls having angles with respect to a tread normal line not more than 10 degrees and extending radially outwardly such that a groove width increases, the groove walls may include a first groove wall located on the side of the inboard tread edge, and the first groove wall may include a chamfered slant portion on the side of the ground contact surface of the tread portion having an angle in a range of from 30 to 80 degrees with respect to the tread normal line.

In another aspect of the invention, the inboard tread region may be provided with first lateral grooves, and each of the first lateral grooves comprises one end in communication with the inboard tread edge and the other end not in communication with the first main groove.

In another aspect of the invention, the tread portion may be provided with second lateral grooves extending from the second main groove toward the outboard tread edge without reaching to the outboard tread edge.

BRIEF DESCRIPTION OF THE DRAWINGS

FIG. 7 is a development view of a tread portion of a pneumatic tire according to another embodiment of the present invention.

DESCRIPTION OF THE PREFERRED EMBODIMENTS

An embodiment of the present invention will be explained below with reference to the accompanying drawings.

Figure 1:
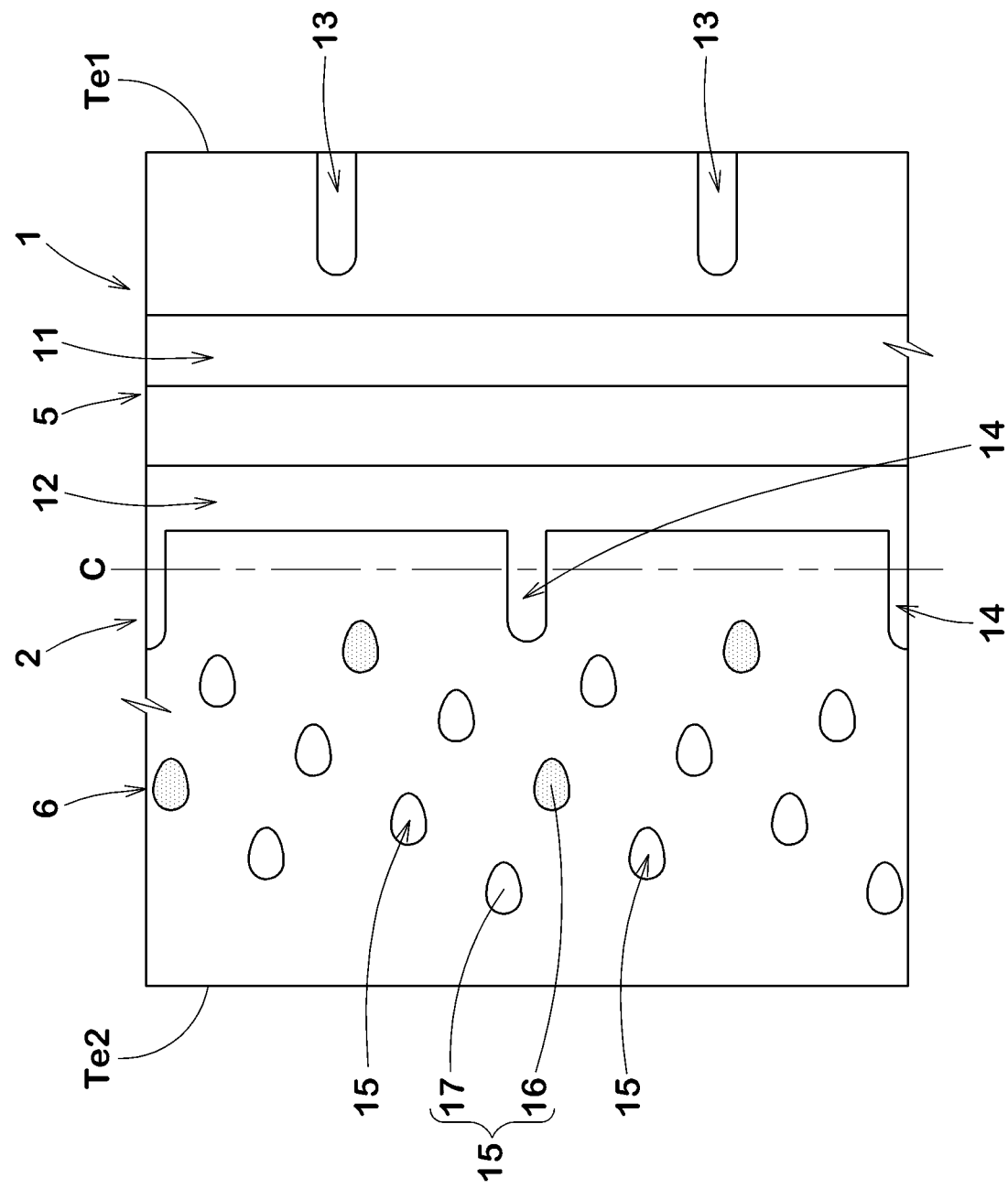
FIG. 1 is a development view of a tread portion of a pneumatic tire according to one embodiment of the present invention.

FIG. 1 illustrates a development view of a tread portion 2 of a pneumatic tire (hereinafter, it may be simply referred to as "tire") 1 according to one embodiment of the present invention. The tire 1 according to the embodiment, for example, is embodied for passenger cars, and is suitably embodied as a high performance tire for sports driving on race tracks in addition to normal driving on public roads.

As illustrated in FIG. 1, the tread portion 2 includes a tread pattern having an installing direction to a vehicle. The installing direction to a vehicle, for example, is indicated on a sidewall portion (not illustrated) and the like using letters or symbols. In FIG. 1, when the tire 1 is installed to a vehicle, the right side and the left side respectively correspond to the inboard side and the outboard side of the vehicle.

By being defined the installing direction to a vehicle, the tread portion 2 includes an inboard tread edge Te1 which positions inside a vehicle and an outboard tread edge Te2 which positions outside the vehicle, when the tire 1 is installed to a vehicle.

As used herein, the tread edges Te1 and Te2 refer to axially outermost edges of the ground contacting patch of the tread portion 2 which occurs under a condition where the tire being under a standard condition is grounded on a plane with a standard tire load at the camber angle of zero.

The standard condition is such that the tire is mounted on a standard wheel rim (not illustrated) with a standard pressure, but is loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like.

The tread portion 2 includes an inboard tread region 5 defined between the tire equator C and the inboard tread edge Te1, and an outboard tread region 6 defined between the tire equator C and the outboard tread edge Te2.

Figure 2:
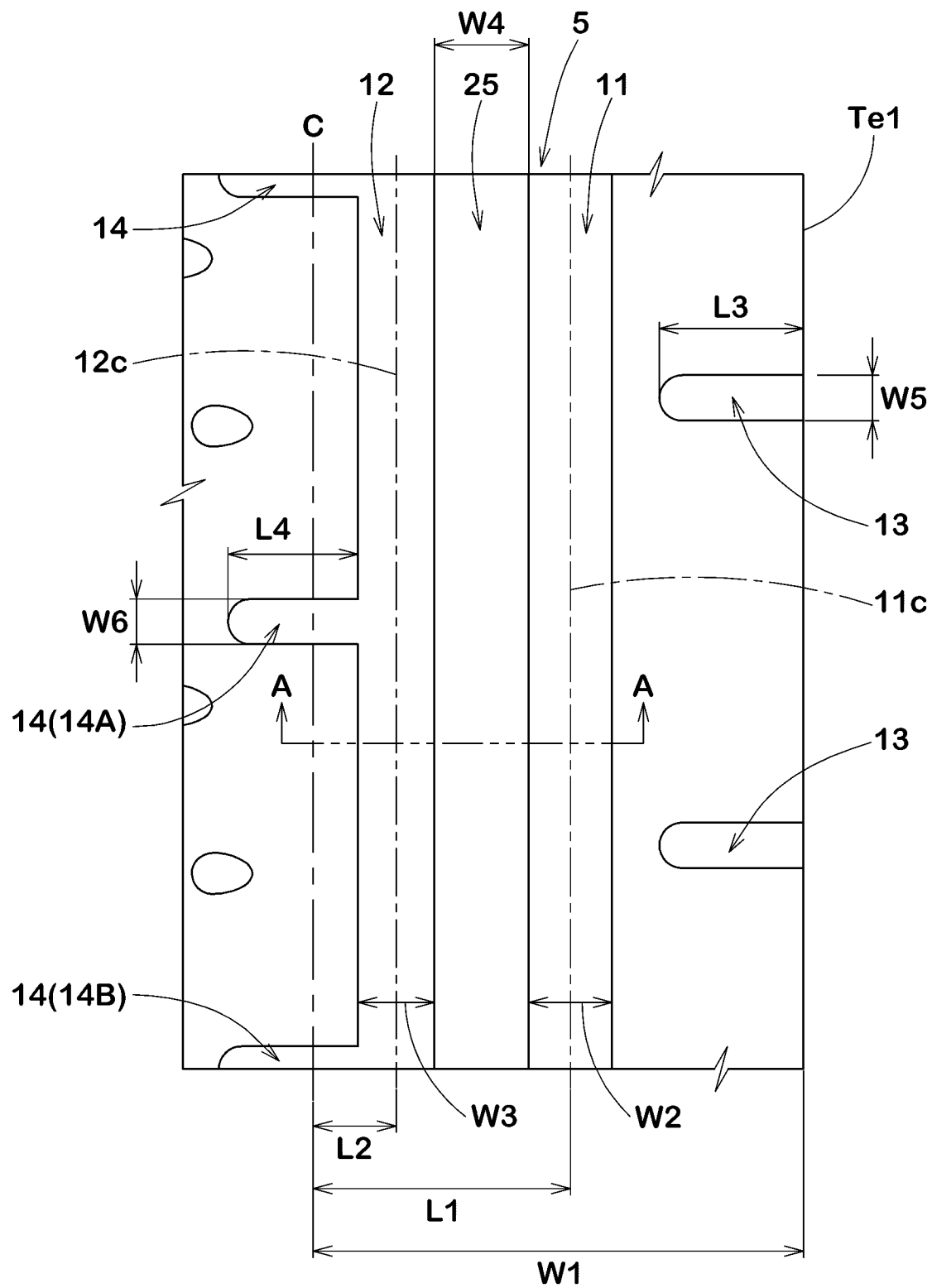
FIG. 2 is an enlarged view of an inboard tread region of FIG. 1.

FIG. 2 illustrates an enlarged view of the inboard tread region 5 of FIG. 1. As illustrated in FIG. 2, the inboard tread region 5 is provided with a first main groove 11 extending continuously in the tire circumferential direction on the side of the inboard tread edge Te1 and a second main groove 12 extending continuously in the tire circumferential direction on the side of the tire equator C. The first main groove 11 and the second main groove 12 can drain the water from between the inboard tread region 5 and the ground effectively to suppress hydroplaning phenomenon when high speed driving on wet road.

The first main groove 11 and the second main groove 12, for example, extend straightly along the tire circumferential direction. Furthermore, the first main groove 11 and the second main groove 12, for example, have constant widths. Note that the first and second main grooves 11 and 12 are not limited to such an aspect, but they may extend in a zigzag or wavy manner and/or may have varying widths.

The first main groove 11 has a groove centerline $11c$ located at a distance L1 in the tire axial direction from the tire equator C. Preferably, the above mentioned distance L1 may be set equal to or more than 0.40 times the width W1 of the inboard tread region 5, more preferably equal to or more than 0.50 times, but preferably equal to or less than 0.70 times, more preferably equal to or less than 0.60 times. Thus, the location of the first main groove 11 may be optimized to balance the rigidity around the tire equator C with the rigidity around the inboard tread edge Te1. Note that the width W1 of the inboard tread region 5 means a length in the tire axial direction from the tire equator C to the inboard tread edge Te1 under the standard condition. Furthermore, the groove centerline means a line that passes the center position between a pair of groove edges.

The second main groove 12, for example, has a groove centerline $12c$ located at a distance L2 in the tire axial direction from the tire equator C. Preferably, the above mentioned distance L2 may be set equal to or more than 0.05 times the width W1 of the inboard tread region 5, more preferably equal to or more than 0.10 times, but preferably equal to or less than 0.20 times, more preferably equal to or less than 0.15 times. Such a second main groove 12 may drain the water around the tire equator C effectively toward outside the tire when driving on wet roads.

Figure 3:
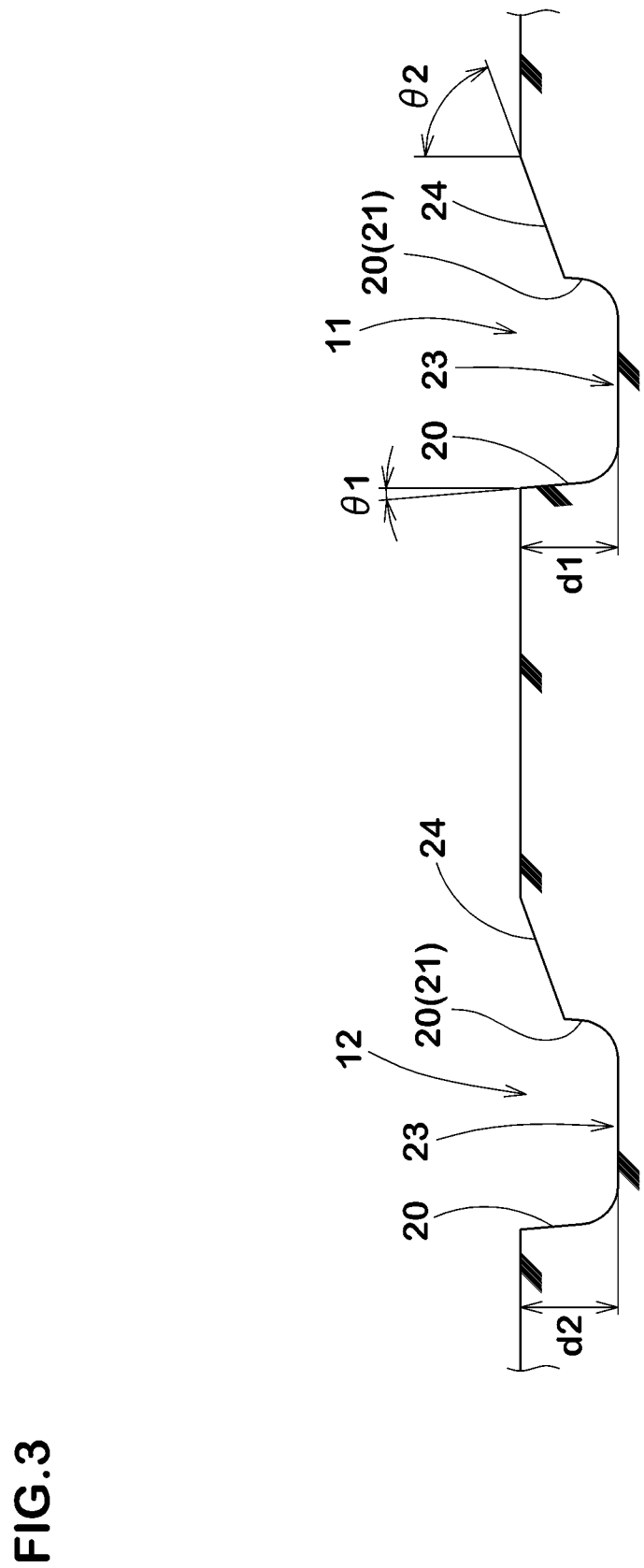
FIG. 3 is a cross-sectional view taken long a line A-A of FIG. 2.

FIG. 3 illustrates a cross-sectional view of the first main groove 11 and the second main groove 12 taken along the line A-A of FIG. 2. As illustrated in FIG. 3, each of the first main groove 11 and the second main groove 12 includes a pair of groove walls 20. The groove walls 20 include portions having angles $\theta 1$ with respect to a tread normal line not more than 10 degrees and extending radially outwardly from groove bottoms such that a groove width increases. In each of the grooves 11 and 12, the groove walls 20 comprise a first groove wall 21 located on the side of the inboard tread edge Te1.

In at least one of the first main groove 11 and the second main groove 12, the first groove wall 21 comprises a chamfered slant portion 24. In this embodiment, the chamfered slant portion 24 is provided on both the first main groove 11 and the second main groove 12. In some preferred embodiments, the first main groove 11 has a cross-sectional shape substantially same as the second main groove 12. Since the chamfered slant portion 24 may increase a volume of the main groove while maintaining rigidity of the tread portion, dry performance of the tire can be balanced with the wet performance. Furthermore, the chamfered slant portion 24 may be useful to suppress uneven wear on the groove edge of the main groove. In order to further improve the above advantageous effect, the chamfered slant portion 24 has an angle $\theta 2$ equal to or more than 30 degrees with respect to the tread normal line, more preferably equal to or more than 40 degrees, but preferably equal to or less than 80 degrees, more preferably equal to or less than 70 degrees.

In order to further improve dry performance on race tracks as well as wet performance on public roads, the groove depths d1 and d2 of the first main groove 11 and the second main groove 12 respectively, for example, are preferably set in a range of from 4.0 to 10.0 mm, more preferably 5.0 to 7.0 mm. As illustrated in FIG. 2, the widths W2 and W3 of the first main groove 11 and the second main groove 12 respectively, for example, are preferably set in a range of from 0.10 to 0.15 times the width W1 of the inboard tread region 5.

As illustrated in FIG. 2, the inboard tread region 5, for example, may include a plain rib 25 where neither grooves nor sipes are provided between the first main groove 11 and the second main groove 12. The plain rib 25 has a width W4 measured at the ground contact surface, for example, is preferably set in a range of from 0.15 to 0.25 times the width W1 of the inboard tread region 5. Such a plain rib 25 may have a high rigidity and which delivers better steering stability on race tracks, for example.

In some preferred embodiments, the inboard tread region 5 may be provided with a plurality of first lateral grooves 13 on the side of the inboard tread edge Te1. Each of the first lateral grooves 13, for example, includes one end in communication with the inboard tread edge Te1 and the other end not in communication with the first main groove 11 to improve wet performance and uneven wear resistance around the inboard tread edge Te1.

Alternatively, in some embodiments, the inboard tread region 5 may be provided with a plurality of second lateral grooves 14 on the side of the tire equator C in addition to or instead of the first lateral grooves 13.

Each of the second lateral grooves 14, for example, extends from the second main groove 12 beyond the tire equator C to reach the outboard tread region 6. Furthermore, the second lateral grooves 14 terminate within the outboard tread region 6 without reaching the outboard tread edge Te2 (FIG. 1). Such a second lateral groove 14 may drain the water around the tire equator C effectively.

In some preferred embodiment, the second lateral grooves 14 may include deep second lateral grooves 14A having depths equal to or more than 5 mm and shallow second lateral grooves 14B having depths smaller than 5 mm. Preferably, the deep second lateral grooves 14A and the shallow second lateral grooves 14B, for example, are arranged alternately in the tire circumferential direction.

In this embodiment, the first lateral grooves 13 and the second lateral grooves 14 extend in a straight manner along the tire axial direction. Further, the first lateral grooves 13 and the second lateral grooves 14 may have constant widths. The first lateral grooves 13 and/or the second lateral grooves 14 may improve uneven wear resistance of the inboard tread region 5.

In order to improve dry performance and wet performance in a well balanced manner, the lengths L3 and L4 of the first lateral grooves 13 and the second lateral grooves 14 respectively are preferably set in a range of from 0.25 to 0.30 times the width W1 of the inboard tread region 5. Preferably, the widths W5 and W6 of the first lateral grooves 13 and the second lateral grooves 14 respectively are set in a range of from 0.05 to 0.10 times the width W1 of the inboard tread region 5.

Figure 4:
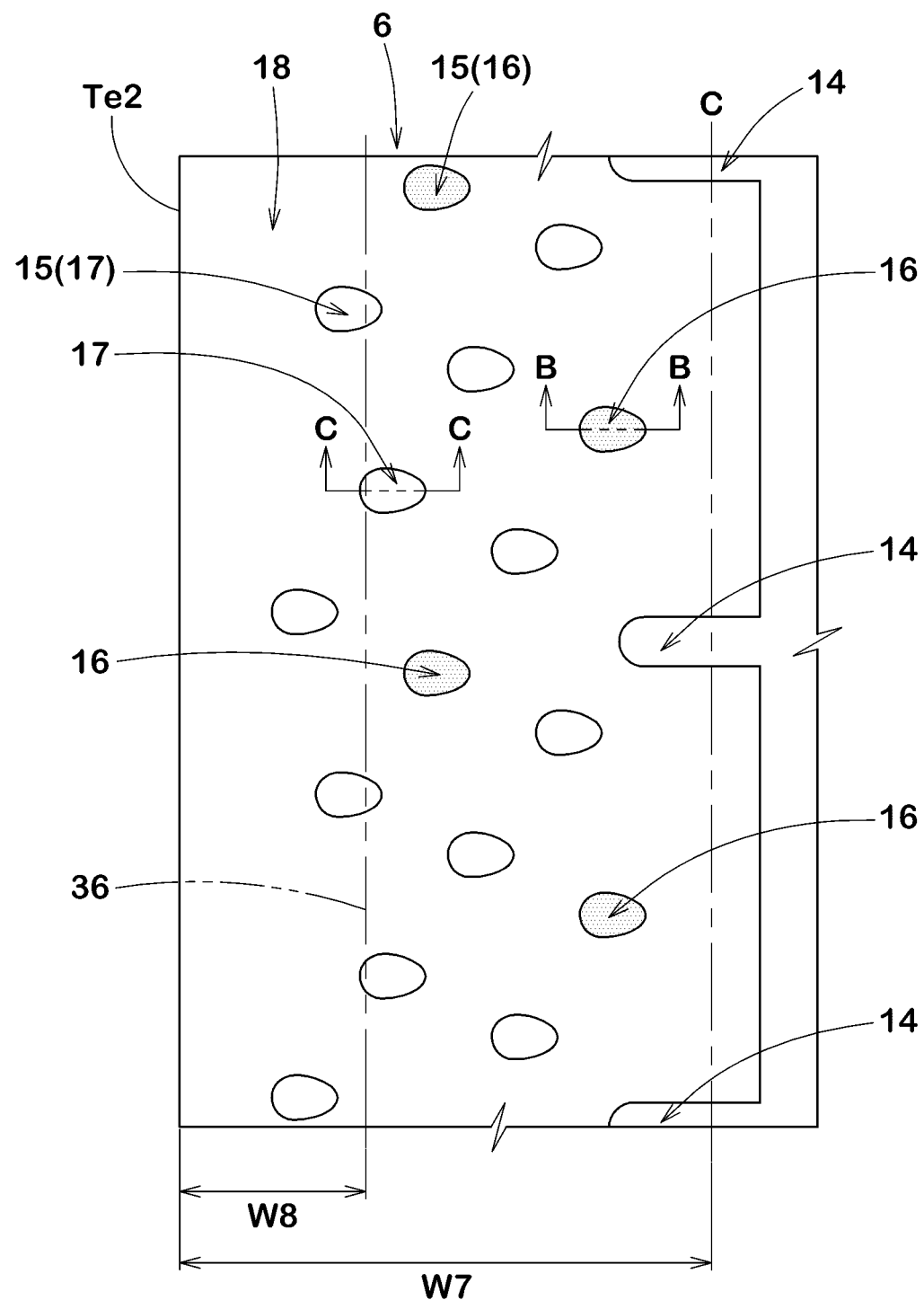
FIG. 4 is an enlarged view of an outboard tread region of FIG. 1.

FIG. 4 illustrates an enlarged view of the outboard tread region 6. As illustrated in FIG. 4, the outboard tread region 6 is provided with a plurality of recesses 15 that are not in communication with other grooves. Such an outboard tread region 6 provided with the recesses 15 tends to generate heat relatively early when driving, and then may deliver high grip performance on race tracks for example. Since the recesses 15 are not in communication with any other grooves, an excessive reduction in rigidity of the outboard tread region 6 may be suppressed. This may be helpful to maintain uneven wear resistance of the outboard tread region 6.

The recesses 15 include a plurality of deep bottom recesses 16 having depths equal to or more than 5 mm.

Namely, the deep bottom recesses 16 means recesses that are configured to have the maximum depths at least 5 mm or more. To help understanding, in FIG. 4, the deep bottom recesses 16 are colored. The deep bottom recesses 16 may also exhibit drainage performance when wet driving on public roads. In some preferred embodiment, the maximum depths of the deep bottom recesses 16 are preferably in a range of from 5.0 to 10.0 mm, more preferably in a range of from 5.0 to 7.0 mm.

A total of opening areas of the deep bottom recesses 16 on the ground contact surface of the tread portion 2 is equal to or less than 5% of a surface area of the outboard tread region 6. Thus, an excessive reduction in rigidity of the outboard tread region 6 may be suppressed and uneven wear resistance of the outboard tread region 6 when sports driving on race tracks may be improved. Note that the above surface area of the outboard tread region 6 means an outer surface area that is obtained by filling up all negative voids, i.e., grooves, Sipes and recesses provided on the outboard tread region 6.

In order to balance wet performance with uneven wear resistance, the total of opening areas of the deep bottom recesses 16 is preferably equal to or less than 4.5% of the surface area of the outboard tread region 6, more preferably equal to or less than 4.0%, but preferably equal to or more than 1.0%, more preferably equal to or more than 1.5%.

In some preferred embodiments, the recesses 15 may include a plurality of shallow bottom recesses 17 having depths less than 5 mm. Namely, the shallow bottom recesses 17 means recesses that are configured to have the maximum depths less than 5 mm. In this embodiment, the maximum depths of the shallow bottom recesses 17, for example, are in a range of from 3.5 to 4.5 mm.

A total of opening areas of the shallow bottom recesses 17 on the ground contact surface of the tread portion 2 is equal to or more than 3%, more preferably equal to or more than 5%, but preferably equal to or less than 10%, more preferably equal to or less than 7%. Thus, an excellent dry performance can be delivered while maintaining wet performance on public roads.

In some preferred embodiments, an axial outer region 18 of the outboard tread region 6 around the outboard tread edge Te2 is not provided with any deep bottom recesses 16, but may be provided with only some shallow bottom recesses 17. Thus, a reduction in rigidity of the outer region 18 due to the recesses 15 can be suppressed to a minimum, and then an excellent dry performance and uneven wear resistance can be delivered.

In some embodiments, the outer region 18 where only the shallow bottom recesses 17, regarding the recesses, are provided has a width W8 in a range of at least 35% of the width W7 of the outboard tread region 6. In FIG. 4, the boundary 36 is indicated by a two-dotted line. Such an outer region 18 with the width W8 may improve cornering performance of the tire when sports driving on race tracks.

Figure 5:
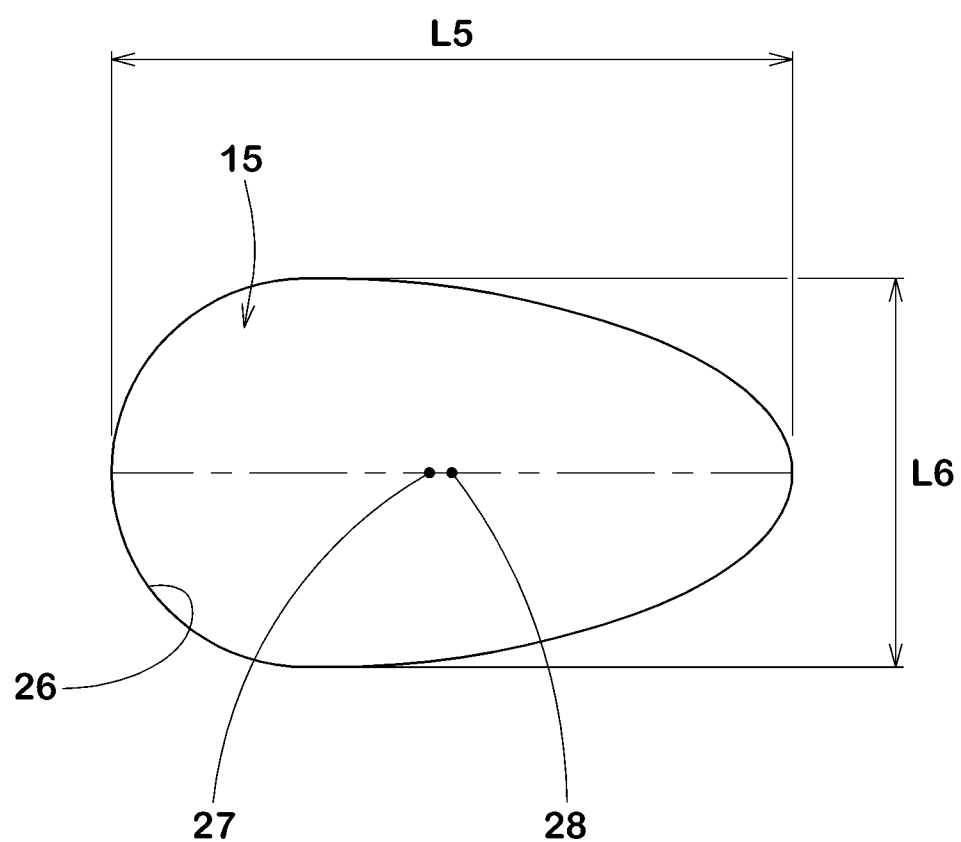
FIG. 5 is an enlarged plan view of a recess.

FIG. 5 illustrates an enlarged plan view of one recess 15. As illustrated in FIG. 5, the recess 15 has an opening edge 26 on the ground contact surface of the tread portion 2. Preferably, the opening edge 26 may be configured as an arc without having a straight portion to suppress uneven wear on the opening edge 26.

In some preferred embodiments, the opening edge 26 of the recess 15 may be formed in a substantially egg shape. For example, a circumferential length of the recess 15 gradually increases from one axial end of the recess toward the other end in the tire axial direction, and after having the maximum circumferential length, the circumferential length of the recess 15 gradually decreases to the other end. In a further preferred embodiment, an area center 27 of the egg-shaped opening edge 26 may be located outside in the tire axial direction to the center point 28 of the opening edge 26 in the tire axial direction. Such an opening edge of the recess 15 may deform flexibly even when receiving a large load, and thus uneven wear on the edge of the recess may be suppressed. Note that the opening edge of the recesses 15 are not limited to such an aspect, but can be modified to the other aspect, e.g., a circular shape, ellipse shape, oval shape and the like.

In each of the recesses 15, the length L5 in the tire axial direction is preferably equal to or more than 5% of the width W7 of the outboard tread region 6 (shown in FIG. 4) in the tire axial direction, more preferably equal to or more than 8%, but preferably equal to or less than 30%, more preferably equal to or less than 15%. In each of the recesses 15, the length L6 in the circumferential direction is preferably equal to or more than 30% of the length L5, more preferably equal to or more than 50%, but preferably equal to or less than 70, more preferably equal to or less than 65%. Such a recess 15 may deliver better wet performance on public roads as well as an excellent dry performance.

Figure 6A:
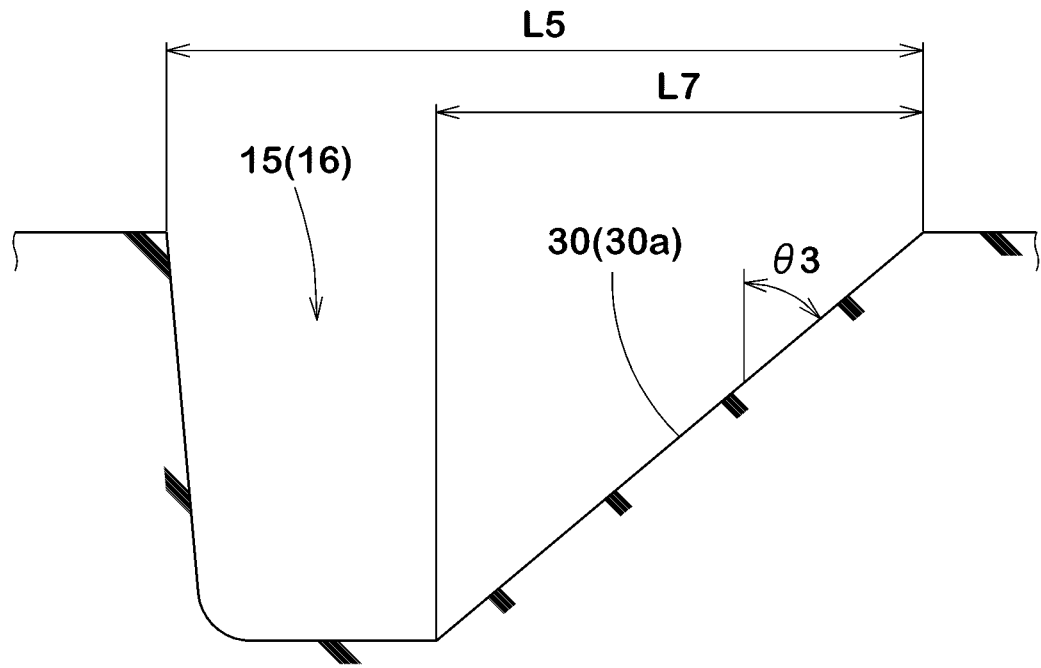
FIG. 6A is a cross-sectional view taken long a line B-B of FIG. 4.
Figure 6B:
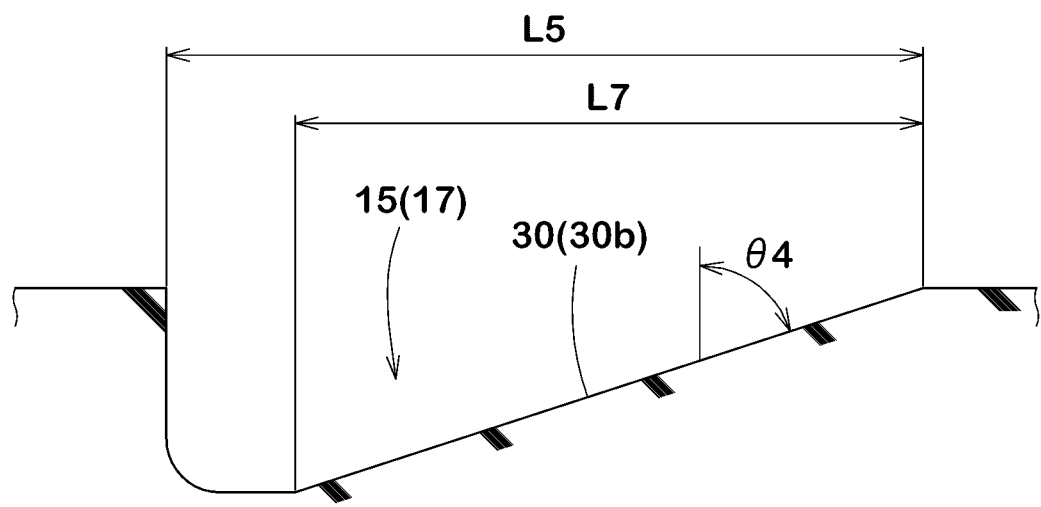
FIG. 6B is a cross-sectional view taken long a line C-C of FIG. 4.

FIG. 6A illustrates a cross-sectional view of one deep bottom recess 16 taken along a line B-B of FIG. 4. FIG. 6B illustrates a cross-sectional view of one shallow bottom recess 17 taken along a line C-C of FIG. 4. As illustrated in FIGS. 6A and 6B, the deep bottom recess 16 and the shallow bottom recess 17, for example, include slant surfaces 30 (30a, 30b) on the side of the tire equator C (on the right side in FIGS. 6A and 6B). The depths of the slant surfaces 30 decrease gradually from the bottom of the recesses toward the tire equator C.

The lengths L7 of the slant surfaces 30 in the tire axial direction, for example, are preferably in a range of from 50% to 90% of the length L5 of the recesses 15 in the tire axial direction in order to suppress uneven wear on the opening edges of the recesses 15 on the side of the tire equator C.

The slant surfaces 30a of the deep bottom recesses 16 have angles θ3 with respect to a tread normal line. The slant surfaces 30b of the shallow bottom recesses 17 have angles θ4 with respect to a tread normal line. Preferably, the angles θ3 are smaller than the angles θ4. In this case, the deep bottom recesses 16 may exert better drainage performance. More specifically, the angles θ3 are preferably in a range of from 40 to 60 degrees, for example, and the angles θ4 are preferably in a range of from 65 to 75 degrees, for example.

Figure 8:
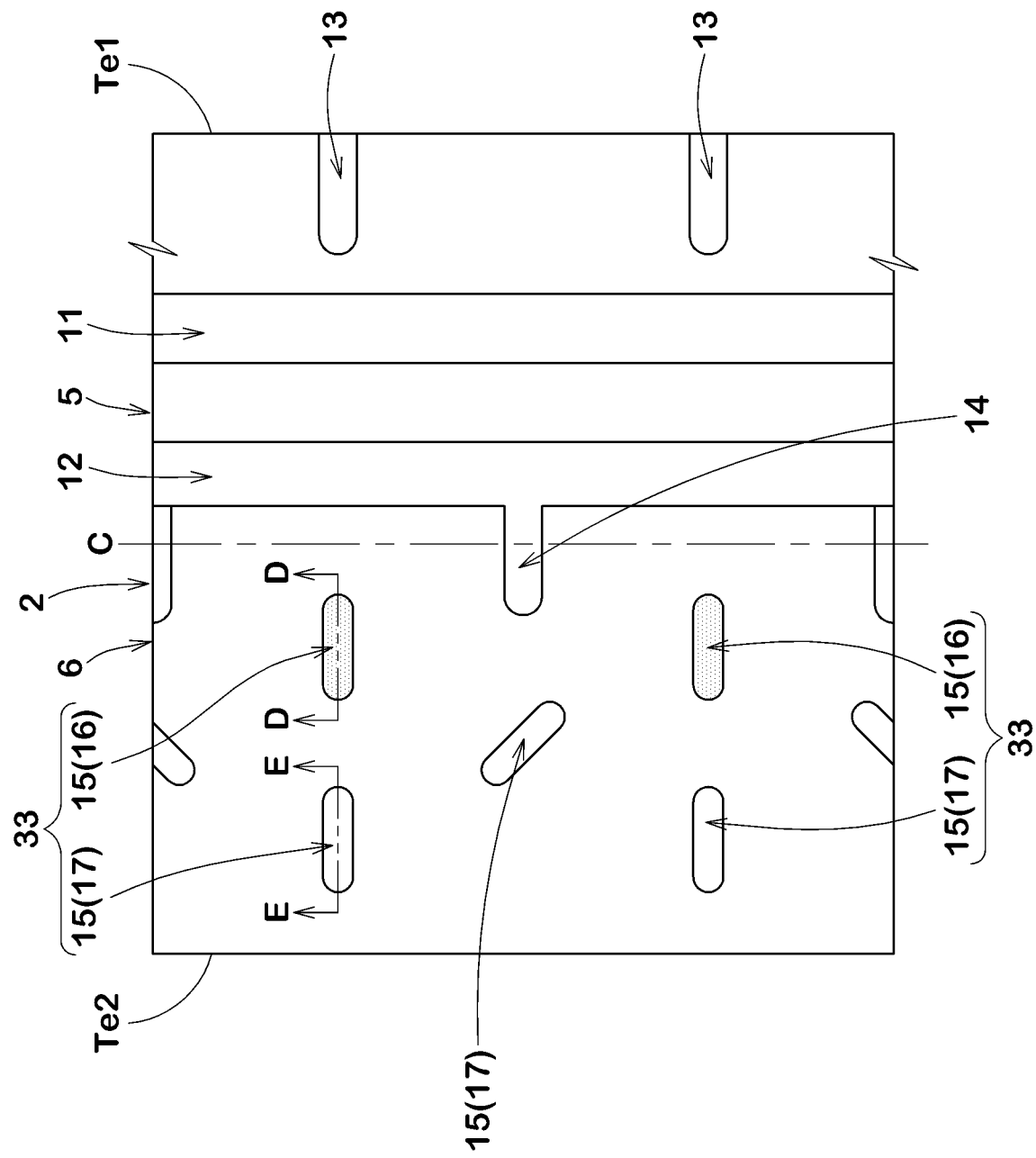
FIG. 8 is a development view of a tread portion of a pneumatic tire according to yet another embodiment of the present invention.

FIG. 7 and FIG. 8 illustrate development views of tread portions 2 in accordance with other embodiments of the present invention. In FIG. 7 and FIG. 8, like or same elements are denoted by the same reference numerals as the above embodiment.

As illustrated in FIG. 7, the outboard tread region 6 may not be provided with any other grooves except for the recesses 15. In this embodiment, the inboard tread region 5 may be provided with only the first main groove 11 and the second main groove 12, and may not be provided with any other lateral grooves. The tire 1 in accordance with the embodiment may deliver better dry performance on race tracks since the outboard tread region 6 has high rigidity.

As illustrated in FIG. 8, the recesses 15 may have opening edges that are configured as oval shapes. In this embodiment, the oval shapes include two parallel straight lines. Furthermore, the recesses 15 may include at least one recess that extends along the tire axial direction, i.e., the two parallel lines of the opening edge extend along the tire axial direction. Furthermore, the recesses 15 may include at least one recess that extends obliquely to the tire axial direction, i.e., the two parallel lines of the opening edge extend obliquely with respect to the tire axial direction. In some preferred embodiment, a pair 33 of recesses 15 may be provided in such a way that two axially extending recesses 15 may be arranged on one tire axial line with a space in the axial direction. The pair 33 of the recesses 15 may be arranged repeatedly in the tire circumferential direction. The obliquely extending recess may be arranged between the pairs 33 of the recesses 15.

Figure 9A:
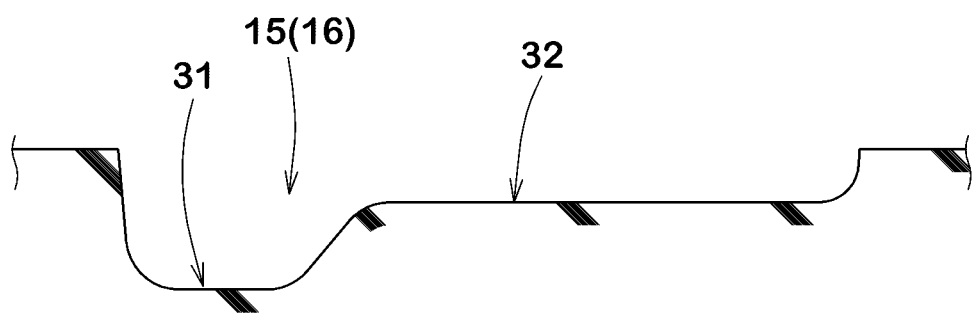
FIG. 9A is a cross-sectional view taken long a line D-D of FIG. 8.
Figure 9B:
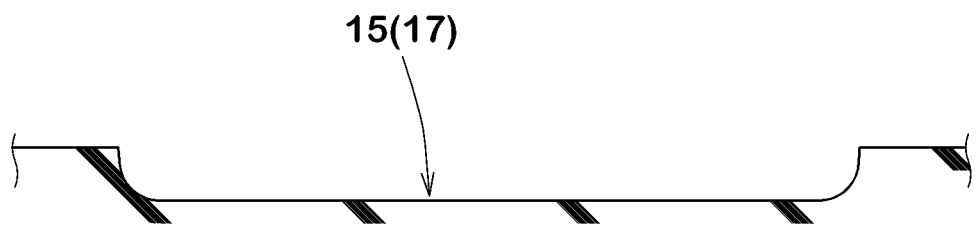
FIG. 9B is a cross-sectional view taken long a line E-E of FIG. 8.

FIG. 9A illustrates a cross-sectional view of one deep bottom recess 16 taken along the line D-D of FIG. 8. FIG. 9B illustrates a cross-sectional view of one shallow bottom recess 17 taken along the line E-E of FIG. 8. As illustrated in FIG. 9A, the deep bottom recess 16, for example, includes a first portion 31 having a depth equal to or more than 5 mm on the side of the outboard tread edge Te2 and a second portion 32 having a depth less than 5 mm on the side of the tire equator C. Preferably, the second portion 32 extends in the tire axial direction with a substantially constant depth. As illustrated in FIG. 9B, the shallow bottom recess 17, for example, has a substantially same depth as the depth of the second portion 32 of the deep bottom recess 16. These deep bottom recess 16 and shallow bottom recess 17 may deliver better dry performance by suppressing a reduction in rigidity of the outboard tread region 6 to the minimum.

While the particularly preferable embodiments in accordance with the present invention have been described in detail, the present invention is not limited to the illustrated embodiments, but can be modified and carried out in various aspects.

Examples

Figure 10:
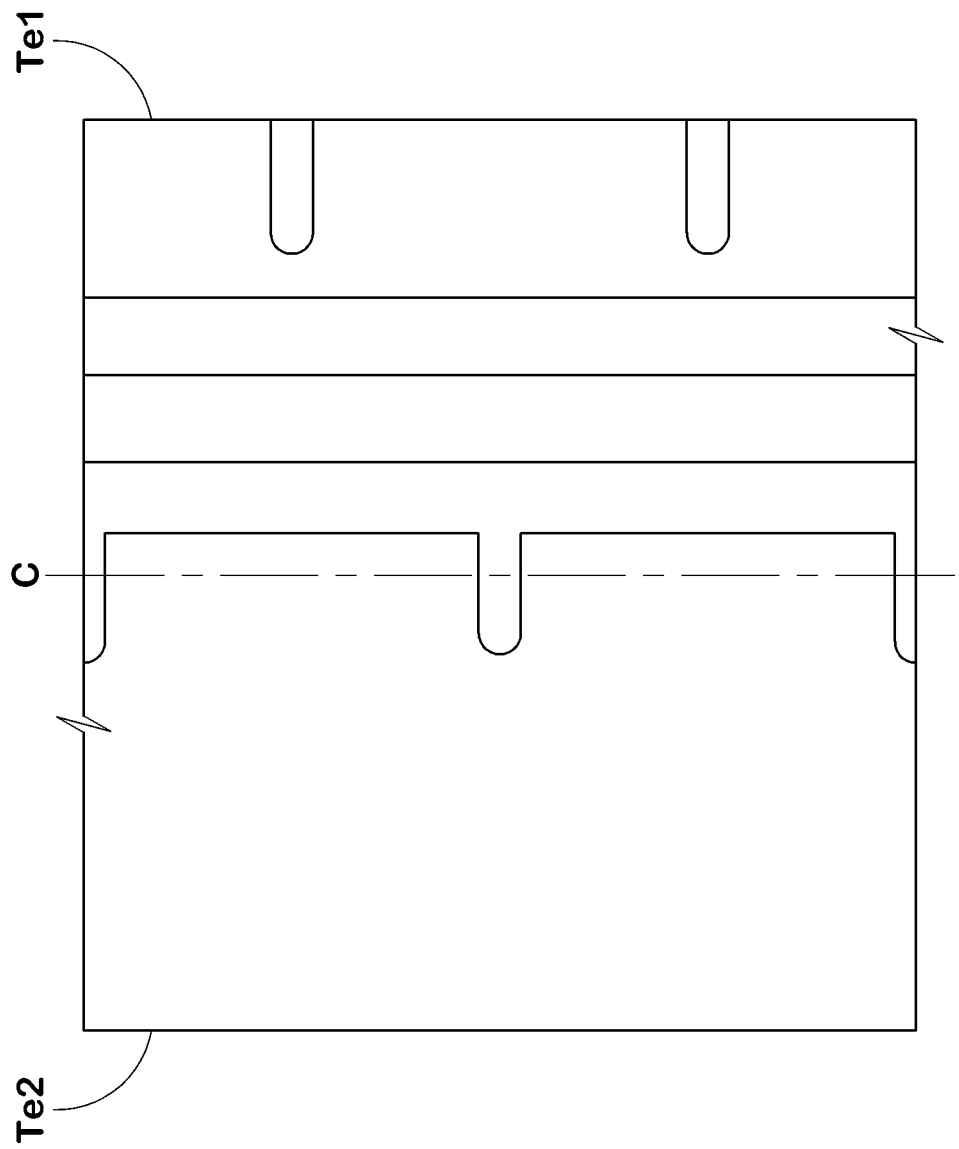
FIG. 10 is a development view of a tread portion of a pneumatic tire of reference example 1.

Pneumatic tires, 205/55R16, having a basic tread pattern as illustrated in either one of FIG. 1, FIG. 7 or FIG. 8 were manufactured based on the details shown in Table 1. As for a first reference tire (Ref. 1), a pneumatic tire having a basic tread pattern as illustrated in FIG. 10 was manufactured. As for a second reference tire (Ref. 2), a pneumatic tire having a basic tread pattern as illustrated in FIG. 1 and a total of opening areas of the deep bottom recesses on a ground contact surface of the tread portion being more than 5% of the surface area of the outboard tread region was also manufactured. The first and second reference tires had the same configuration as the example tires except the above differences. Then, dry performance, wet performance and uneven wear resistance of the tires were tested. The test methods are as follows.

Dry Performance Test:

Each of the test tires mounted on a rim 16×7.0 J with an internal pressure of 200 kPa was installed to an FR vehicle having a displacement of 2,000 cc as the all wheels, and then a driver drove the vehicle to evaluate its driving performance on a dry asphalt test road based on his sense. The test results are shown in Table 1 using a score wherein the Ref. 1 is set to 100. The larger the score, the better the dry performance is.

Wet Performance Test:

Using an inside drum tester, hydroplaning speed of each test was measured when the tire was made to run on a drum surface covered with water of a 5.0 mm deep under the following condition. The test results are shown in Table 1 using an index wherein the Ref. 1 is set to 100. The larger the score, the better the wet performance is.

Slip angle: 1.0 degree

Vertical tire load: 4.2 kN

Uneven Wear Resistance Test:

After the above test vehicle was driven for a certain distance, the difference of wear amount on the tread portion between the locations of the tire equator and the outboard tread edge was measured. The test results are shown in Table 1 using an index wherein the Ref. 1 is set to 100. The smaller the score, the better the uneven wear resistance is.

Table 1 shows the test results. The test results shows that the pneumatic tires in accordance with the embodiment were improved in the dry performance, the wet performance and the uneven wear resistance in a well balanced manner

TABLE 1

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| Tread pattern | FIG. 10 | FIG. 1 | FIG. 1 | FIG. 1 | FIG. 1 | FIG. 1 | FIG. 1 | FIG. 1 |
| Total opening area of deep bottom recesses/surface area of outboard tread region (%) | — | 7.1 | 1.8 | 1.0 | 1.5 | 4.0 | 4.5 | 1.8 |
| Total opening area of shallow bottom recesses/surface area of outboard tread region (%) | — | 0 | 5.3 | 5.3 | 5.3 | 5.3 | 5.3 | 3.0 |
| Axial length L5 of recesses/width of outboard tread region (%) | — | 11.0 | 11.0 | 11.0 | 11.0 | 11.0 | 11.0 | 11.0 |
| Circumferential length L6 of recesses/axial length L5 of recesses (%) | — | 68.0 | 68.0 | 68.0 | 68.0 | 68.0 | 68.0 | 68.0 |
| Distance L1 from tire equator to first main groove/width W1 of inboard tread region | 0.52 | 0.52 | 0.52 | 0.52 | 0.52 | 0.52 | 0.52 | 0.52 |
| Distance L2 from tire equator to second main groove/width W1 of inboard tread region | 0.15 | 0.15 | 0.15 | 0.15 | 0.15 | 0.15 | 0.15 | 0.15 |
| Dry performance (score) | 100 | 99 | 103 | 103 | 103 | 102 | 102 | 105 |
| Wet performance (index) | 100 | 108 | 108 | 106 | 108 | 110 | 111 | 105 |
| Uneven wear resistance (index) | 100 | 106 | 98 | 97 | 98 | 101 | 103 | 98 |

|  | Ex. 7 | Ex. 8 | Ex. 9 | Ex. 10 | Ex. 11 | Ex. 12 | Ex. 13 | Ex. 14 |
|---|---|---|---|---|---|---|---|---|
| Tread pattern | FIG. 1 | FIG. 1 | FIG. 1 | FIG. I | FIG. 1 | FIG. 1 | FIG. 1 | FIG. 1 |
| Total opening area of deep bottom recesses/surface area of outboard tread region (%) | 1.8 | 1.8 | 1.8 | 1.8 | 1.8 | 1.8 | 1.8 | 1.8 |
| Total opening area of shallow bottom recesses/surface area of outboard tread region (%) | 5.0 | 7.0 | 10.0 | 5.3 | 5.3 | 5.3 | 5.3 | 5.3 |
| Axial length L5 of recesses/width of outboard tread region (%) | 11.0 | 11.0 | 11.0 | 5.0 | 30.0 | 11.0 | 11.0 | 11.0 |
| Circumferential length L6 of recesses/axial length L5 of recesses (%) | 68.0 | 68.0 | 68.0 | 68.0 | 68.0 | 30.0 | 70.0 | 68.0 |
| Distance L1 from tire equator to first main groove/width W1 of inboard tread region | 0.52 | 0.52 | 0.52 | 0.52 | 0.52 | 0.52 | 0.52 | 0.40 |
| Distance L2 from tire equator to second main groove/width W1 of inboard tread region | 0.15 | 0.15 | 0.15 | 0.15 | 0.15 | 0.15 | 0.15 | 0.15 |
| Dry performance (score) | 103 | 103 | 101 | 103 | 103 | 103 | 103 | 101 |
| Wet performance (index) | 108 | 109 | 110 | 107 | 109 | 108 | 108 | 109 |
| Uneven wear resistance (index) | 98 | 100 | 100 | 97 | 102 | 98 | 98 | 101 |

|  | Ex. 15 | Ex. 16 | Ex. 17 | Ex. 18 | Ex. 19 | Ex. 20 | Ex. 21 | Ex. 22 |
|---|---|---|---|---|---|---|---|---|
| Tread pattern | FIG. 1 | FIG. 1 | FIG. 1 | FIG. 7 | FIG. 7 | FIG. 8 | FIG. 8 | FIG. 8 |
| Total opening area of deep bottom recesses/surface area of outboard tread region (%) | 1.8 | 1.8 | 1.8 | 1.5 | 4.0 | 2.4 | 1.5 | 3.5 |
| Total opening area of shallow bottom recesses/surface area of outboard tread region (%) | 5.3 | 5.3 | 5.3 | 5.3 | 5.3 | 5.3 | 5.3 | 5.3 |
| Axial length L5 of recesses/width of outboard tread region (%) | 11.0 | 11.0 | 11.0 | 11.0 | 11.0 | 22.8 | 22.8 | 22.8 |
| Circumferential length L6 of recesses/axial length L5 of recesses (%) | 68.0 | 68.0 | 68.0 | 68.0 | 68.0 | 28.9 | 28.9 | 28.9 |
| Distance L1 from tire equator to first main groove/width W1 of inboard tread region | 0.70 | 0.52 | 0.52 | 0.52 | 0.52 | 0.52 | 0.52 | 0.52 |
| Distance L2 from tire equator to second main groove/width W1 of inboard tread region | 0.15 | 0.05 | 0.2 | 0.15 | 0.15 | 0.15 | 0.15 | 0.15 |
| Dry performance (score) | 104 | 103 | 103 | 106 | 105 | 102 | 103 | 101 |
| Wet performance (index) | 106 | 108 | 108 | 105 | 106 | 109 | 108 | 109 |
| Uneven wear resistance (index) | 98 | 98 | 98 | 99 | 100 | 98 | 98 | 98 |

What is claimed is:

1. A pneumatic tire comprising:
a tread portion having an installing direction to a vehicle to define an outboard tread edge and an inboard tread edge, the tread portion comprising an inboard tread region between a tire equator and the inboard tread edge, and an outboard tread region between the tire equator and the outboard tread edge;
wherein the inboard tread region is provided with only two circumferentially continuously extending main grooves consisting of a first main groove extending continuously in a tire circumferential direction on the side of the inboard tread edge and a second main groove extending continuously in the tire circumferential direction on the side of the tire equator, wherein the first main groove is not connected to any other grooves,
wherein a region between the first main groove and the inboard tread edge is provided with lateral grooves consisting of first lateral grooves each having one end in communication with the inboard tread edge and the other end not in communication with the first main groove;
wherein the outboard tread region is provided with a plurality of recesses that are not in communication with other grooves, and the outboard tread region is not provided with any circumferentially continuously extending grooves;
wherein the plurality of recesses comprises a plurality of deep bottom recesses having depths equal to or more than 5 mm; and
wherein a total of opening areas of the deep bottom recesses on a ground contact surface of the tread portion is equal to or less than 5% of a surface area of the outboard tread region that is obtained by filling up all recesses provided thereon.

2. The pneumatic tire according to claim 1, wherein the recesses comprise at least one shallow bottom recess having a depth less than 5 mm, and a total of opening areas of the at least one shallow bottom recess on the ground contact surface of the tread portion is in a range of from 3% to 10% of the surface area of the outboard tread region.

3. The pneumatic tire according to claim 2, wherein the outboard tread region is not provided with any other grooves except the recesses.

4. The pneumatic tire according to claim 1, wherein each of the recesses has a length in a tire axial direction in a range of from 5% to 30% of a width of the outboard tread region in the tire axial direction.

5. The pneumatic tire according to claim 4, wherein each of the recesses has a length in the tire circumferential direction in a range of from 30% to 70% of the length of the recess in the tire axial direction.

6. The pneumatic tire according to claim 1, wherein each of the recesses has an opening edge on the ground contact surface of the tread portion, and the opening edge is configured as an arc without having a straight portion.

7. The pneumatic tire according to claim 6, wherein the opening edge is formed in a substantially egg shape such that an area center of the opening edge is located outside in the tire axial direction with respect to the center point of the opening edge in the tire axial direction.

8. The pneumatic tire according to claim 1, wherein the first main groove has a groove centerline located at a distance in a tire axial direction of from 0.40 to 0.70 times a width of the inboard tread region from the tire equator.

9. The pneumatic tire according to claim 8, wherein the second main groove has a groove centerline located at a distance in the tire axial direction of from 0.05 to 0.20 times the width of the inboard tread region from the tire equator.

10. The pneumatic tire according to claim 1, wherein at least one of the first main groove and the second main groove comprises a pair of groove walls having angles with respect to a tread normal line not more than 10 degrees and extending radially outwardly such that a groove width increases,
the groove walls comprise a first groove wall located on the side of the inboard tread edge, and
the first groove wall comprises a chamfered slant portion on the side of the ground contact surface of the tread portion having an angle in a range of from 30 to 80 degrees with respect to the tread normal line.

11. The pneumatic tire according to claim 1, wherein the tread portion is provided with second lateral grooves extending from the second main groove toward the outboard tread edge without reaching to the outboard tread edge.

12. The pneumatic tire according to claim 2, wherein each of the recesses has a length in a tire axial direction in a range of from 5% to 30% of a width of the outboard tread region in the tire axial direction.

13. The pneumatic tire according to claim 3, wherein each of the recesses has a length in a tire axial direction in a range of from 5% to 30% of a width of the outboard tread region in the tire axial direction.

14. The pneumatic tire according to claim 1, wherein the inboard tread region comprises a plain rib between the first main groove and the second main groove, and wherein the plain rib is not provided with any grooves nor sipes.

15. The pneumatic tire according to claim 1, wherein the recesses comprise a plurality of shallow bottom recesses having depths less than 5 mm, and wherein the total of opening areas of the deep bottom recesses is smaller than a total of opening areas of the plurality of shallow bottom recesses.

16. The pneumatic tire according to claim 1, wherein the plurality of deep bottom recesses is arranged in a staggered manner in the tire circumferential direction.

17. The pneumatic tire according to claim 16, wherein widths of the first main groove and the second main groove are in a range of from 0.10 to 0.15 times a width W1 in a tire axial direction of the inboard tread region.

18. A pneumatic tire comprising:
a tread portion having an installing direction to a vehicle to define an outboard tread edge and an inboard tread edge, the tread portion comprising an inboard tread region between a tire equator and the inboard tread edge, and an outboard tread region between the tire equator and the outboard tread edge;
wherein the inboard tread region is provided with only two circumferentially continuously extending main grooves consisting of a first main groove extending continuously in a tire circumferential direction on the side of the inboard tread edge and a second main groove extending continuously in the tire circumferential direction on the side of the tire equator, wherein the first main groove is not connected to any other grooves;

wherein the outboard tread region is provided with a plurality of recesses that are not in communication with other grooves, and the outboard tread region is not provided with any circumferentially continuously extending grooves;

wherein the plurality of recesses comprises a plurality of deep bottom recesses having depths equal to or more than 5 mm; and wherein a total of opening areas of the deep bottom recesses on a ground contact surface of the tread portion is equal to or less than 5% of a surface area of the outboard tread region that is obtained by filling up all recesses provided thereon.

* * * * *